United States Patent
Okada et al.

(10) Patent No.: US 10,362,847 B1
(45) Date of Patent: Jul. 30, 2019

(54) LENS FOR PROTECTIVE CASE

(71) Applicant: OTTER PRODUCTS, LLC, Fort Collins, CO (US)

(72) Inventors: Marina Okada, San Diego, CA (US); Dallas M. Scaggs, San Diego, CA (US); Weishin T. Sharp, San Diego, CA (US)

(73) Assignee: Otter Products, LLC, Fort Collins, CO (US)

( * ) Notice: Subject to any disclaimer, the term of this patent is extended or adjusted under 35 U.S.C. 154(b) by 0 days.

(21) Appl. No.: 16/271,446

(22) Filed: Feb. 8, 2019

Related U.S. Application Data (60) Provisional application No. 62/640,670, filed on Mar. 9, 2018.

(51) Int. Cl.
  *A45C 11/00* (2006.01)
  *H04B 1/3888* (2015.01)

(52) U.S. Cl.
  CPC ............ *A45C 11/00* (2013.01); *H04B 1/3888* (2013.01); *A45C 2011/002* (2013.01); *A45C 2011/003* (2013.01); *A45C 2200/10* (2013.01)

(58) Field of Classification Search
  CPC .......... A45C 13/002; G06F 2200/1633; G03B 17/08; G03B 15/05; H05K 5/061; H05K 5/069; H05K 5/0013; B29C 45/1676
  See application file for complete search history.

(56) References Cited

U.S. PATENT DOCUMENTS

| | | |
|---|---|---|
| 6,995,976 B2 | 2/2006 | Richardson |
| 7,158,376 B2 | 1/2007 | Richardson et al. |
| 7,889,489 B2 | 2/2011 | Richardson et al. |
| 7,949,242 B2 | 5/2011 | Yang et al. |
| 8,155,514 B1 | 4/2012 | Chow et al. |
| 8,342,325 B2 | 1/2013 | Rayner |
| 8,393,466 B2 | 3/2013 | Rayner |
| 8,648,957 B2 | 2/2014 | Ryu |
| 8,917,496 B2 | 12/2014 | Richardson et al. |
| 9,001,176 B2 | 4/2015 | Springer |
| 9,548,785 B2 | 1/2017 | Rayner |
| 9,729,770 B2 | 8/2017 | Barros et al. |
| 2003/0209661 A1 | 11/2003 | Chen et al. |
| 2005/0030707 A1 | 2/2005 | Richardson et al. |
| 2006/0126173 A1 | 6/2006 | Yakushiji et al. |
| 2006/0147191 A1 | 7/2006 | Kim |
| 2011/0294543 A1 | 12/2011 | Lapstun et al. |
| 2012/0314354 A1 | 12/2012 | Rayner |

(Continued)

FOREIGN PATENT DOCUMENTS

WO 2013090843 A1 6/2013

*Primary Examiner* — Nizar N Sivji (57) ABSTRACT

A protective case for an electronic device having a camera and a microphone. The protective case including a lens assembly that comprises a transparent lens and a water-resistant membrane attached to the transparent lens and configured to cover the microphone of the installed electronic device. The transparent lens has a first side configured to face the electronic device when the electronic device is installed in the protective case and a second side opposite the first side. A first portion of the first side and a second portion of the second side are each coated with a light-blocking material. The first portion has an area greater than an area of the second portion.

20 Claims, 11 Drawing Sheets

(56) References Cited

U.S. PATENT DOCUMENTS

| | | | |
|---|---|---|---|
| 2014/0097071 A1* | 4/2014 | Park | H04M 1/22 |
| | | | 200/314 |
| 2014/0119718 A1 | 5/2014 | Oh et al. | |
| 2016/0066460 A1* | 3/2016 | Rayner | A45C 13/008 |
| | | | 224/191 |
| 2016/0178805 A1 | 6/2016 | Kang et al. | |
| 2017/0146701 A1* | 5/2017 | Nagahama | G03B 9/02 |
| 2019/0081652 A1 | 3/2019 | Ranjeva et al. | |

* cited by examiner

LENS FOR PROTECTIVE CASE

CROSS REFERENCE TO RELATED APPLICATIONS

This application claims priority to U.S. Provisional Application No. 62/640,670 filed Mar. 9, 2018, the disclosure of which is hereby incorporated by reference in its entirety.

BACKGROUND

Personal electronic devices are commonly used for communication, entertainment purposes, as well as Internet access and a variety of other purposes. Examples of personal electronic devices include smartphones, tablet computers, gaming devices, audio players, video players, cameras, portable computers, two-way radios, GPS receivers, smart glasses, virtual reality glasses or helmets, masks or eyewear including an electronic display, and/or other portable devices. Protective cases for electronic devices provide protection for the electronic device from various forms of damage, including damage from dust, water, snow, dirt, and drops. Exemplary protective cases are disclosed in U.S. Pat. Nos. 8,342,325 and 9,300,344, the disclosures of which are hereby incorporated by reference in their entirety.

Many electronic devices include a camera and associated flash, such as a flash LED, for providing light when taking a picture with the camera. The camera and flash are often positioned in close proximity, such as on the rear of the electronic device. It can be desirable to include a lens covering with the protective case to protect the camera and/or flash from damage, such as scratches or water. However, the presence of a protective lens over one or both of the camera and flash reduces the amount of light transmitted from the flash to subject, as well as the light from the subject to the camera aperture.

In some electronic devices, an audio port for a speaker or microphone may be positioned proximate the camera and/or flash. However, covering the audio port with a lens may decrease the quality of the sound transmitted across the lens, resulting in unacceptable audio quality.

Improvements in the foregoing are desired.

SUMMARY

In one example, a protective case is provided for an electronic device having a camera and a microphone. The protective case including a lens assembly that comprises a transparent lens and a water-resistant membrane attached to the transparent lens and configured to cover the microphone of the installed electronic device. The transparent lens has a first side configured to face the electronic device when the electronic device is installed in the protective case and a second side opposite the first side. A first portion of the first side and a second portion of the second side are each coated with a light-blocking material. The first portion has an area greater than an area of the second portion.

In one example, a protective case is provided for an electronic device having a camera, a flash, and a microphone. The protective case includes a lens assembly comprising a water-resistant membrane configured to cover the microphone of the installed electronic device and a transparent lens affixed to the water-resistant membrane. The transparent lens includes a first side configured to face the electronic device and fully cover the camera and the flash when the electronic device is installed in the protective case, a first portion of the first side being coated with a light-blocking material and a first optically transparent portion that is not coated or free of the light-blocking material. The transparent lens further includes a second side opposite the first side, a second portion of the second side being coated with a light-blocking material and a second optically transparent portion that is not coated or free of the light-blocking material. The second optically transparent portion has an area greater than an area of the first optically transparent portion. The first portion has an area greater than an area of the second portion. The transparent lens further includes a first aperture configured to be aligned with the microphone of the installed electronic device.

In one example, a protective case is provided for an electronic device. The protective case includes a front surface configured to at least partially cover a front surface of the electronic device when the electronic device is installed in the protective case, the front surface of the protective case configured to allow interactive access to a touch screen of the electronic device; a plurality of side surfaces configured to at least partially cover a plurality of side surfaces of the installed electronic device; and a rear surface configured to at least partially cover a rear surface of the installed electronic device. The rear surface includes a lens assembly for protecting a camera, a flash, and a microphone of the installed electronic device. The lens assembly includes a water-resistant membrane attached to the transparent lens and configured to cover the microphone of the installed electronic device, the water-resistant membrane including a first aperture configured to be aligned with the camera of the installed electronic device and a second aperture configured to be aligned with the flash of the installed electronic device. The lens assembly also includes a transparent lens affixed to the water-resistant membrane. The transparent lens includes a first side configured to face the electronic device and fully cover the camera and the flash when the electronic device is installed in the protective case, a first portion of the first side being coated with a light-blocking material; a second side opposite the first side, a second portion of the second side being coated with a light-blocking material, wherein the first portion has an area greater than an area of the second portion; and a third aperture configured to be aligned with the microphone of the installed electronic device.

DETAILED DESCRIPTION

Figure 1:
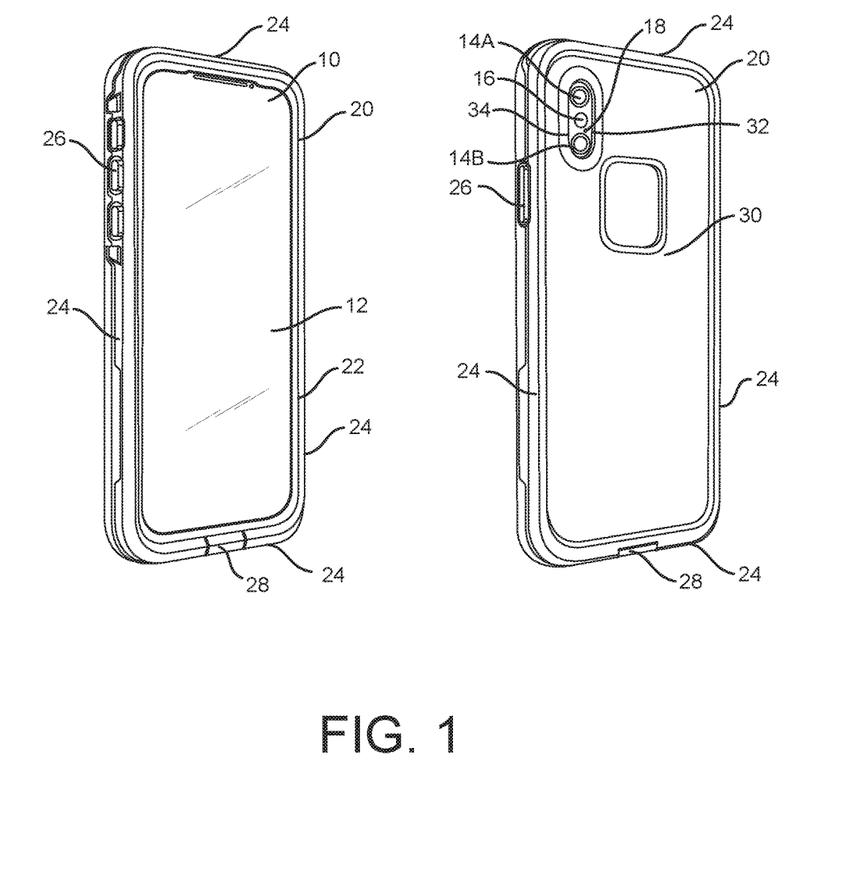
FIG. 1A illustrates a front perspective view of an electronic device enclosed in an exemplary protective case.
FIG. 1B illustrates a rear perspective view of the electronic device and protective case of FIG. 1A.

An exemplary electronic device 10 and protective case 20 are illustrated in FIGS. 1A and 1B. Although FIGS. 1A and 1B illustrate electronic device 10 as a smartphone computer, in other embodiments the electronic device 10 may be selected from, without limitation, tablet computers, gaming devices, audio players, video players, cameras, portable computers, two-way radios, GPS receivers, smart glasses, virtual reality glasses or helmets, masks or eyewear including an electronic display, and/or other portable electronic devices.

Electronic device 10 may include one or more display screens, such as an interactive touch-screen 12 accessible when the electronic device 10 is installed in protective case 20, as well as various audio inputs and outputs, and/or user input buttons (not illustrated in FIGS. 1A and 1B).

Electronic device 10 includes a first camera 14A, a second camera 14B, and flash 16, each illustratively positioned on a rear surface of electronic device 10. Electronic device 10 further includes a microphone 18 positioned on the rear surface of electronic device 10 proximate cameras 14A, 14B and flash 16. In some embodiments, electronic device 10 includes additional cameras 14, flashes 16, and microphones 18. As illustrated in FIG. 1B, the flash 16 is positioned between cameras 14A, 14B, and microphone 18 is positioned proximate camera 14B and flash 16. In other exemplary embodiments, cameras 14A, 14B, flash 16, and microphone 18 have other suitable arrangements.

Protective case 20 encases at least a portion of electronic device 10 to prevent device 10 from being damaged. Protective case 20 may comprise a single-piece into which electronic device 10 is fitted, or protective case 20 may include two or more pieces removably attached to each other through one or more clasping or coupling mechanisms. Exemplary protective cases 20 are disclosed in U.S. Pat. Nos. 8,342,325 and 9,300,344, the disclosures of which are hereby incorporated by reference in their entirety.

Protective case 20 illustratively includes a front surface 22 covering and protecting at least a portion of the front surface of electronic device 10. In some embodiments, protective case 20 may include a membrane at least partially covering touch-screen 12. In other embodiments, protective case 20 may include an aperture through which touch-screen 12 can be directly accessed. Protective case 20 includes a plurality of side surfaces 24 at least partially covering and protecting corresponding side surfaces of electronic device 10. Side surfaces 24 may include one or more buttons 26 or port doors 28 configured to allow access to buttons or ports of electronic device 10.

Protective case 20 includes a rear surface 30 covering and protecting at least a portion of a back surface of electronic device 10. Rear surface 30 illustratively includes an aperture 32 in which is positioned a lens assembly 34 for covering and protecting at least a portion of cameras 14A, 14B, flash 16, and microphone 18.

Figure 2A:
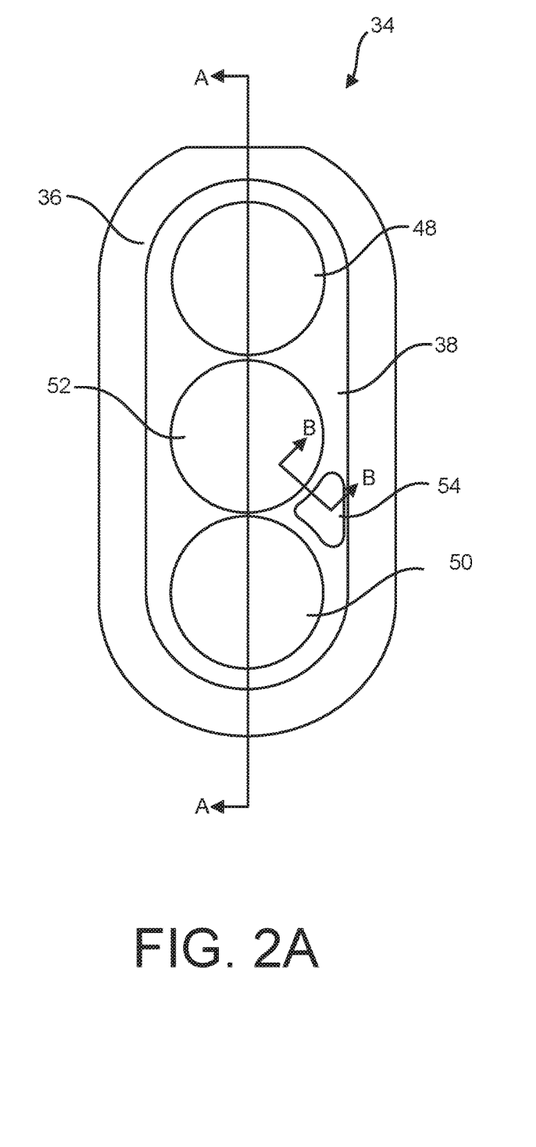
FIG. 2A illustrates a front view of an exemplary lens assembly.
Figure 2B:
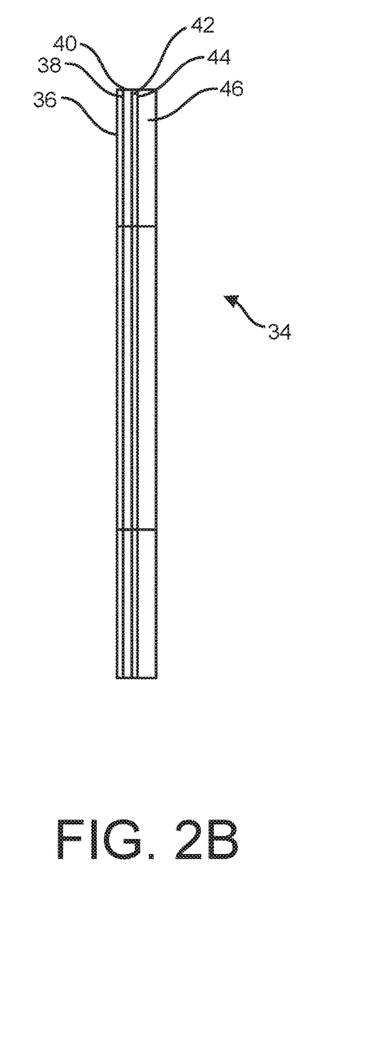
FIG. 2B illustrates a side view of the lens assembly of FIG. 2A.
Figure 2C:
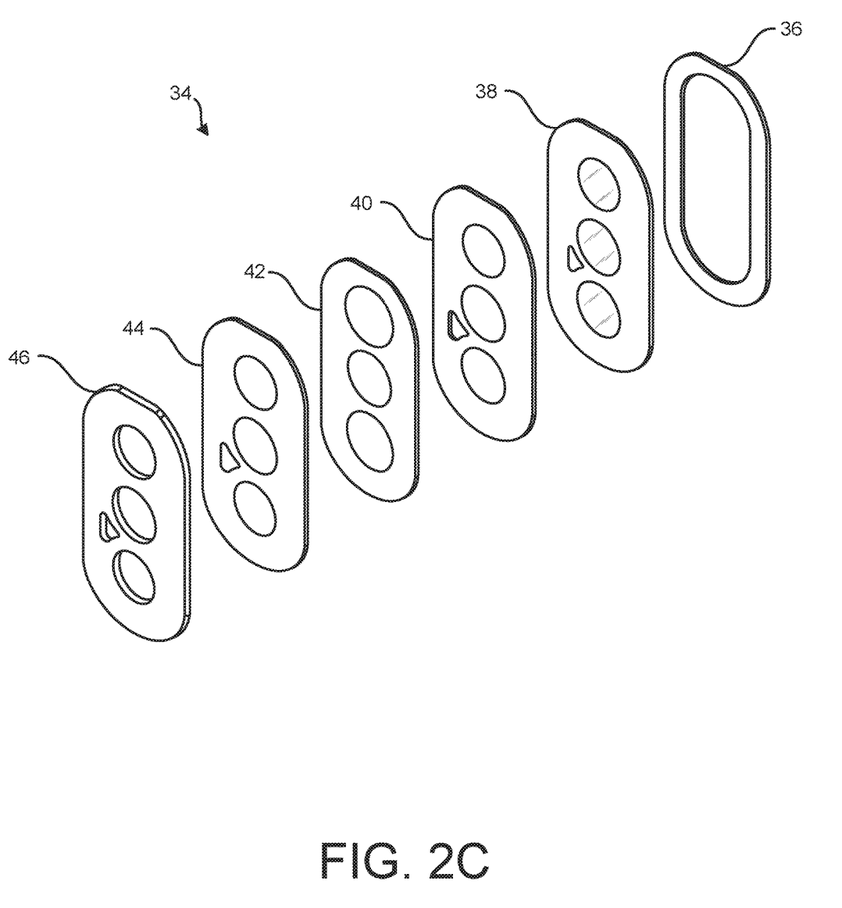
FIG. 2C illustrates an exploded view of the lens assembly of FIG. 2A.
Figure 2D:
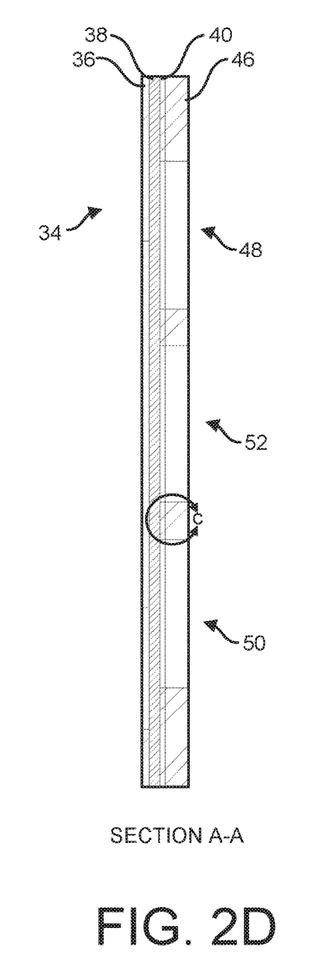
FIG. 2D illustrates a sectional view of a lens assembly along the line A-A in FIG. 2A.
Figure 2E:
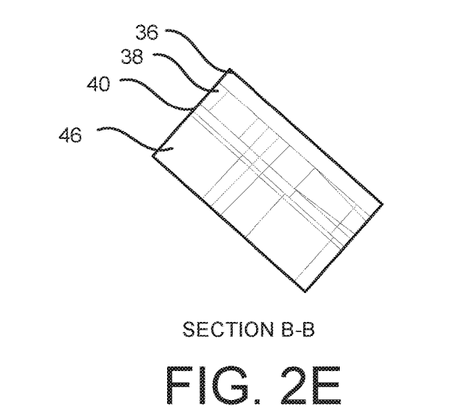
FIG. 2E illustrates a sectional view of a lens assembly along the line B-B in FIG. 2A.
Figure 2F:
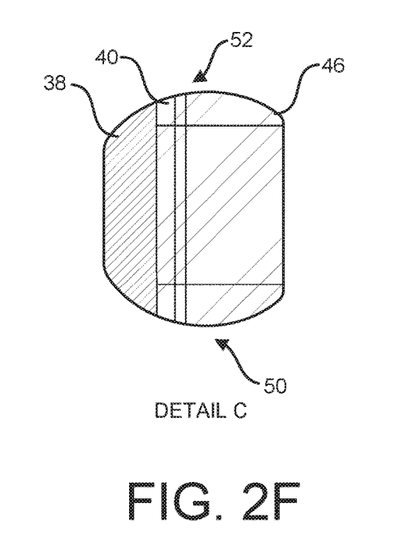
FIG. 2F illustrates an enlarged view of a lens assembly of the portion indicated in the circle C in FIG. 2D.

Referring next to FIGS. 2A-2F, an exemplary lens assembly 34 is illustrated. FIG. 2A illustrates a front view of an exemplary lens assembly 34. FIG. 2B illustrates a side view of lens assembly 34. FIG. 2C illustrates an exploded view of exemplary lens assembly 34. FIG. 2D illustrates a sectional view of lens assembly 34 along the line A-A in FIG. 2A. FIG. 2E illustrates a sectional view of lens assembly 34 along the line B-B in FIG. 2A. FIG. 2F illustrates an enlarged view of the portion of lens assembly indicated by circle C in FIG. 2D.

As shown in FIG. 2C, lens assembly 34 is illustratively formed from an adhesive ring 36, lens 38, first adhesive layer 40, water-resistant membrane 42, second adhesive layer 44, and compressible foam layer 46. In some exemplary embodiments, lens assembly 34 does not include every layer illustrated in FIG. 2C. In other exemplary embodiments, lens assembly 34 may include more layers than those illustrated in FIG. 2C, such as a removable protective coating. In still other exemplary embodiments, one or layers illustrated in FIG. 2C may be formed from two or more distinct pieces. In still other exemplary embodiments, one or more of the layers illustrated in FIG. 2C may be combined with another layer.

In some exemplary embodiments, lens assembly 34 includes first optically transparent portion 48 configured to align with first camera 14A of installed electronic device 10. In some exemplary embodiments, lens assembly 34 includes second optically transparent portion 50 configured to align with second camera 14B of installed electronic device 10. In some exemplary embodiments, lens assembly 34 includes third optically transparent portion 52 configured to align with flash 16 of installed electronic device 10. Optically transparent portions 48, 50, 52 allow light to travel through lens assembly 34. In some exemplary embodiments, each optically transparent portion 48, 50, 52 allows as little as 50%, 60%, 75%, 80%, 85%, as great as 90%, 95%, 97%, 98%, 99%, or greater, of light to pass through the optically transparent portion or within any range defined between any two of the foregoing values, such as 50% to 99%, 75% to 95%, or 75% to 90%.

In some exemplary embodiments, lens assembly 34 further includes acoustically transparent portion 54. Acoustically transparent portion 54 allows sound to travel through lens assembly 34. In some exemplary embodiments, acoustically transparent portion 54 allows as little as 50%, 60%, 75%, 80%, 85%, as great as 90%, 95%, 97%, 98%, 99%, or greater, of sound to pass through acoustically transparent portion 54, or within any range defined between any two of the foregoing values, such as 50% to 99%, 75% to 95%, or 75% to 90%.

Figure 3:
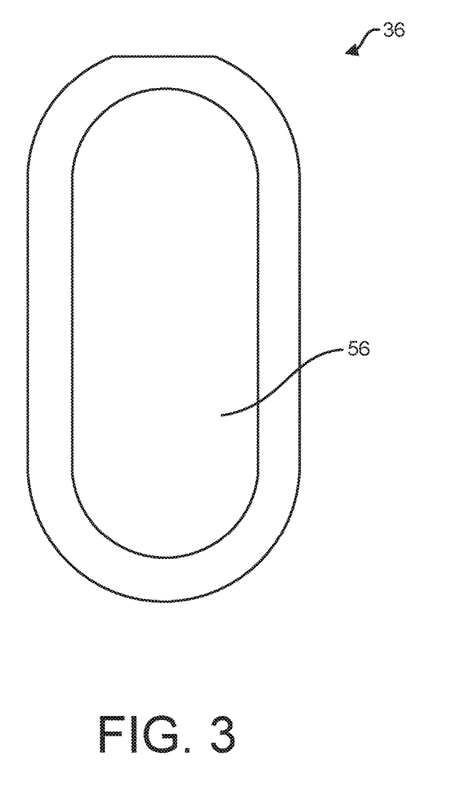
FIG. 3 illustrates an exemplary adhesive ring of the lens assembly of FIG. 2A.

Referring to FIG. 3, an exemplary adhesive ring 36 is illustrated. In some exemplary embodiments, adhesive ring 36 affixes lens assembly 34 to the rear surface 30 of protective case 20. As illustrated in FIG. 2C, adhesive ring 36 is directly affixed to lens 38. The middle of adhesive ring 36 illustratively includes an aperture 56 allowing access to lens 38. As shown in FIG. 2C, optically transparent portions 48, 50, 52 and acoustically transparent portion 54 are aligned with aperture 56.

Figure 4A:
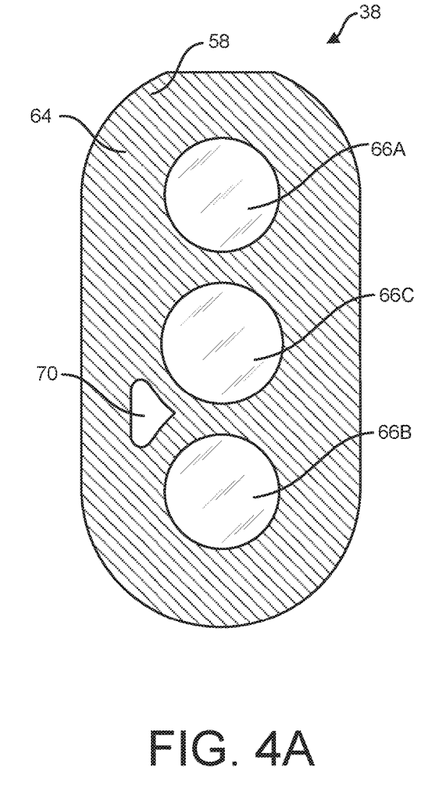
FIG. 4A illustrates a rear view of an exemplary lens of the lens assembly of FIG. 2A.
Figure 4B:
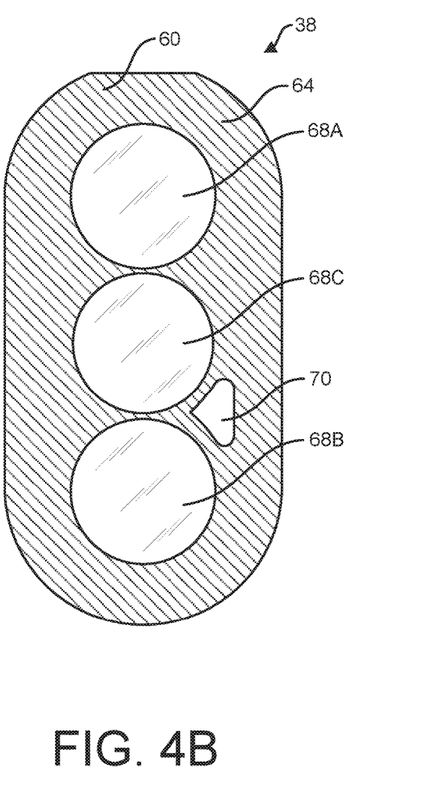
FIG. 4B illustrates a front view of an exemplary lens of the lens assembly of FIG. 2A.

An exemplary lens 38 is illustrated in FIGS. 4A and 4B. Lens 38 illustratively comprises a transparent substrate, such as sapphire, glass, or a transparent plastic such as nylon, poly(meth methacrylate) (PMMA), or polyethylene terephthalate (PET). In some exemplary embodiments, lens 38 comprises a single piece of the transparent substrate. In other examples, lens 38 may comprise multiple components. FIG. 4A illustrates the front surface 58 of lens 38, which is positioned closer to an interior of the protective case 20 and the installed electronic device 10. FIG. 4B illustrates the rear surface 60 of lens 38, which is positioned away from the interior of the protective case 20 and the installed electronic device 10.

The front surface 58 and rear surface 60 of lens 38 are each partially coated with a light blocking material 64. In some exemplary embodiments, light blocking material 64 is an ink pad printed onto surfaces 58, 60 of lens 38.

Front surface 58 includes one or more optically transparent regions 66. As illustrated in FIG. 4A, front surface includes three optically transparent regions 66A, 66B, and 66C configured to align with the first camera 14A, the second camera 14B, and the flash 16, respectively, of installed electronic device 10.

Rear surface 60 includes one or more optically transparent regions 68. As illustrated in FIG. 4B, rear surface includes three optically transparent regions 68A, 68B, and 68C configured to align with the first camera 14A, the second camera 14B, and the flash 16, respectively, of installed electronic device 10.

In some exemplary embodiments, optically transparent region 66A comprises a first optically transparent region, optically transparent region 68A comprises a second optically transparent region, optically transparent region 66B comprises a third optically transparent region, optically transparent region 68B comprises a fourth optically transparent region, optically transparent region 66C comprises a fifth optically transparent region, and optically transparent region 68C comprises a sixth optically transparent region. In other exemplary embodiments, lens 38 includes more or fewer than six optically transparent regions.

Optically transparent regions 66A and 68A of lens 38 illustratively form a portion of optically transparent region 48 of lens 34 for first camera 14A. Optically transparent regions 66B and 68B of lens 38 illustratively form a portion of optically transparent region 50 of lens 34 for second camera 14B. Optically transparent regions 66C and 68C of lens 38 illustratively form a portion of optically transparent region 52 of lens 34 for flash 16.

Figure 9:
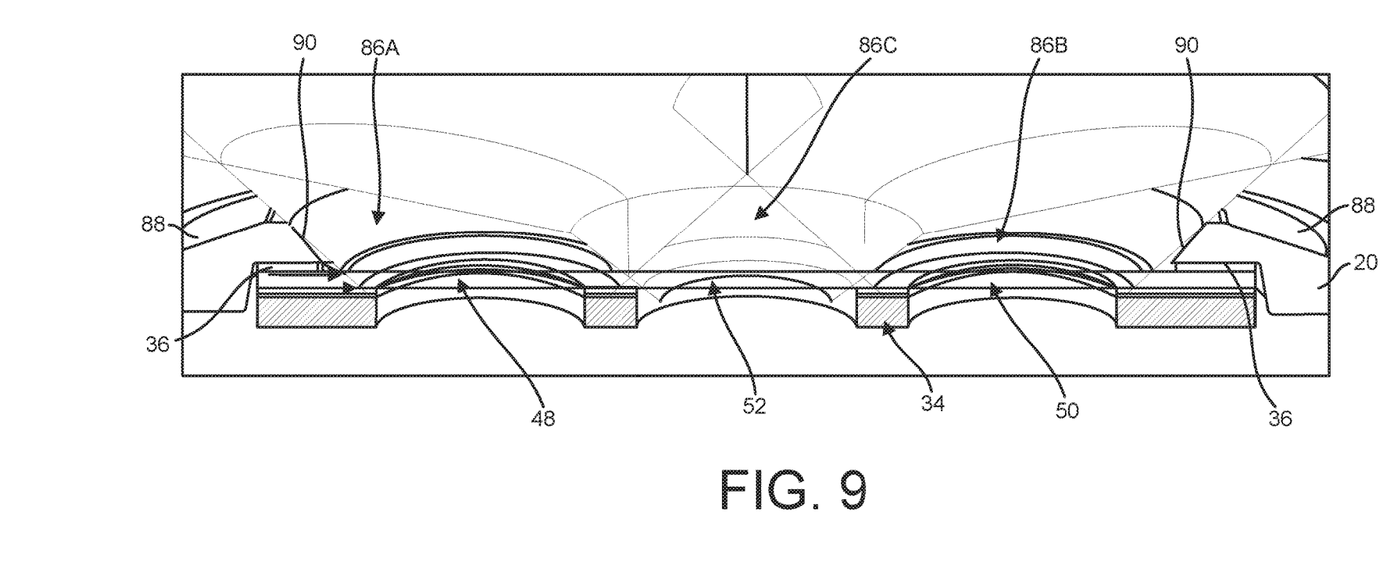
FIG. 9 illustrates a sectional view of the lens assembly of FIG. 2A in an exemplary protective case.

As illustrated in FIGS. 4A and 4B, the optically transparent regions 66A, 66B, 66C of front surface 58 are smaller than the corresponding optically transparent regions 68A, 68B, 68C of rear surface 60. In some embodiments, the corresponding optically transparent regions 68A, 68B, 68C of rear surface 60 may be larger than the corresponding optically transparent regions 66A, 66B, 66C of front surface 58 by as little as 1%, 2%, 5%, 10%, as great as 15%, 20%, 25%, 30%, 40% or greater, or within any range defined by any two of the foregoing values, such as 1% to 40%, 10% to 30%, or 20% to 25%. Referring to FIG. 9, the larger optically transparent regions 68 of rear surface 60 position the light-blocking material outside the respective field of view 86A, 86B, 86C for first camera 14A, second camera 14B, and flash 16. The area encompassed by fields of view 86A, 86B, 86C may also be referred to as keep out zones or keep out cones. It can be desirable to keep the fields of view 86A, 86B, 86C as clear from obstruction as possible.

Acoustic aperture 70 extends through lens 38. Acoustic aperture 70 is configured to align with microphone 18 of installed electronic device 10. Acoustic aperture 70 forms a portion of acoustically transparent region 54 of lens assembly 34.

Figure 5:
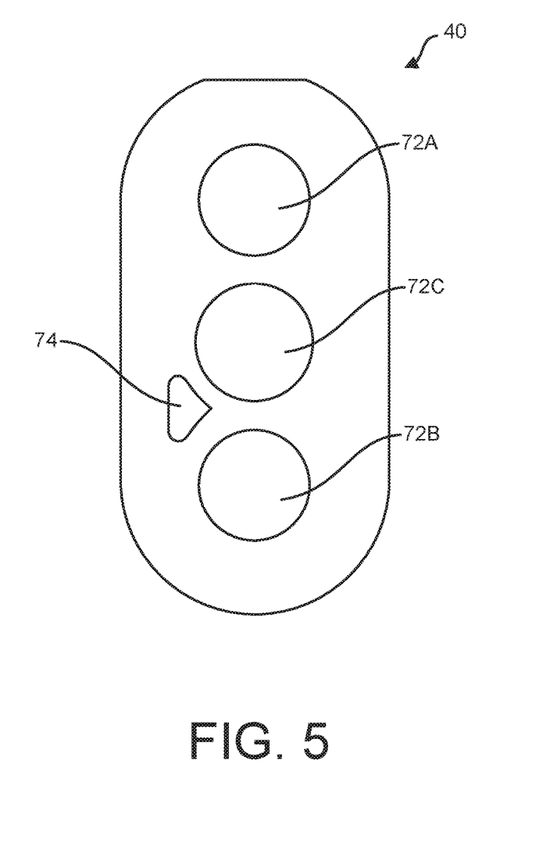
FIG. 5 illustrates an exemplary first adhesive layer of the lens assembly of FIG. 2A.

Referring next to FIG. 5, an exemplary first adhesive layer 40 is illustrated. As shown in FIG. 2C, first adhesive layer 40 affixes lens 38 to water-resistant membrane 42. First adhesive layer 40 illustratively includes three optical apertures 72A, 72B, 72C configured to align with the first camera 14A, second camera 14B, and flash 16, respectively, of electronic device 10. The three optical apertures 72A, 72B, 72C form a portion of optically transparent portions 48, 50, 52 of lens assembly 34. First adhesive layer 40 further includes acoustic aperture 74 configured to align with microphone 18 of electronic device 10. Acoustic aperture 74 forms a portion of acoustically transparent region 54 of lens assembly 34.

Figure 6:
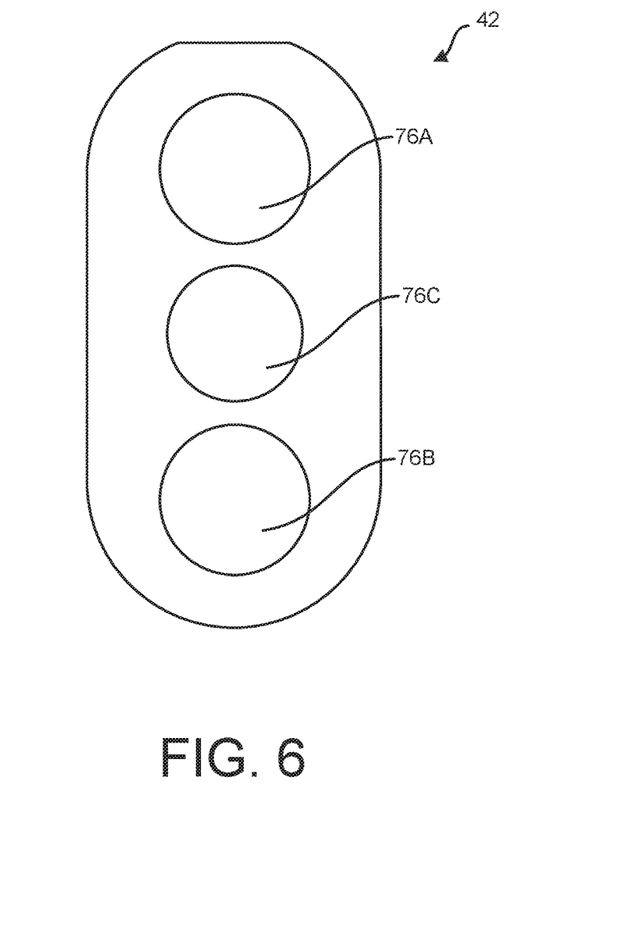
FIG. 6 illustrates an exemplary membrane of the lens assembly of FIG. 2A.

Referring next to FIG. 6, an exemplary water-resistant membrane 42 is illustrated. Water-resistant membrane 42 illustratively includes three optical apertures 76A, 76B, 76C configured to align with the first camera 14A, second camera 14B, and flash 16, respectively, of electronic device 10. The three optical apertures 76A, 76B, 76C form a portion of optically transparent portions 48, 50, 52 of lens assembly 34.

Water-resistant membrane 42 forms a portion of acoustically transparent region 54 of lens assembly 34. In some exemplary embodiments, water-resistant membrane 42 has a relatively small pore size that allows air, such as sound waves, to pass through the water-resistant membrane 42, but prevents or resists the flow of water through the water-resistant membrane 42. Exemplary membranes include woven mesh and expanded PTFE material. In some exemplary embodiments, water-resistant membrane 42 has a pore size as large as 100 micron or less, 75 micron or less, 50 micron or less, 40 micron or less, 30 micron or less, 25 micron or less, 20 micron or less, 15 micron or less, or within a range defined between any two of the foregoing values, such as 15 micron to 100 micron, 15 micron to 40 micron, 20 micron to 40 micron, 25 micron to 40 micron, or 25 micron to 30 micron.

Figure 7:
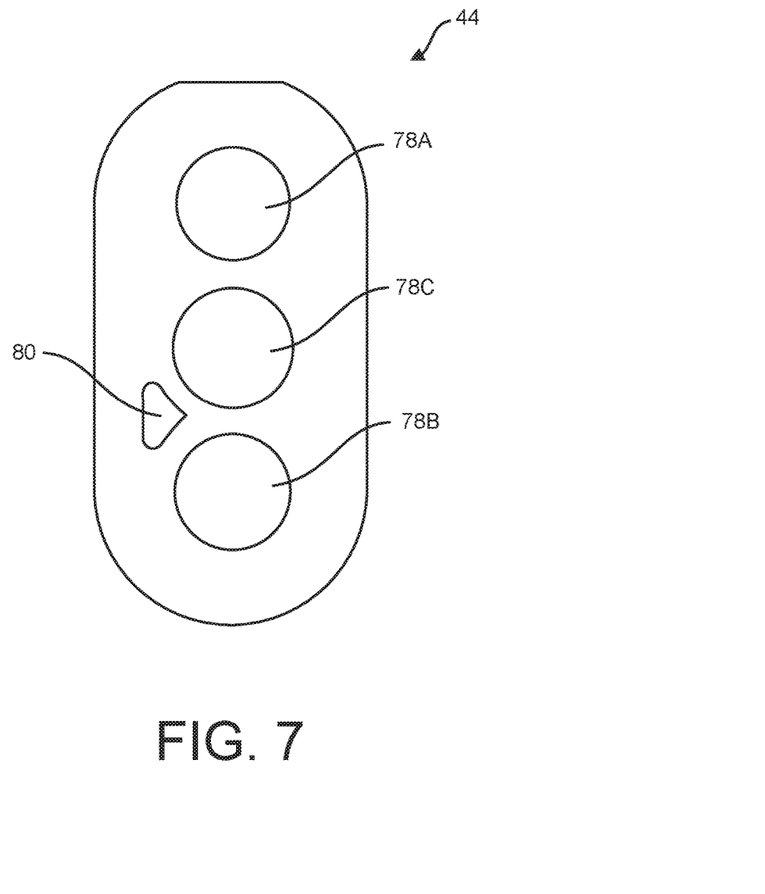
FIG. 7 illustrates an exemplary second adhesive layer of the lens assembly of FIG. 2A.

Referring next to FIG. 7, an exemplary second adhesive layer 44 is illustrated. As shown in FIG. 2C, second adhesive layer 44 affixes lens water-resistant membrane 42 to compressible foam layer 46. Second adhesive layer 44 illustratively includes three optical apertures 78A, 78B, 78C configured to align with the first camera 14A, second camera 14B, and flash 16, respectively, of electronic device 10. The three optical apertures 78A, 78B, 78C form a portion of optically transparent portions 48, 50, 52 of lens assembly 34. Second adhesive layer 44 further includes acoustic aperture 80 configured to align with microphone 18 of electronic device. Acoustic aperture 80 forms a portion of acoustically transparent region 54 of lens assembly 34.

Figure 8:
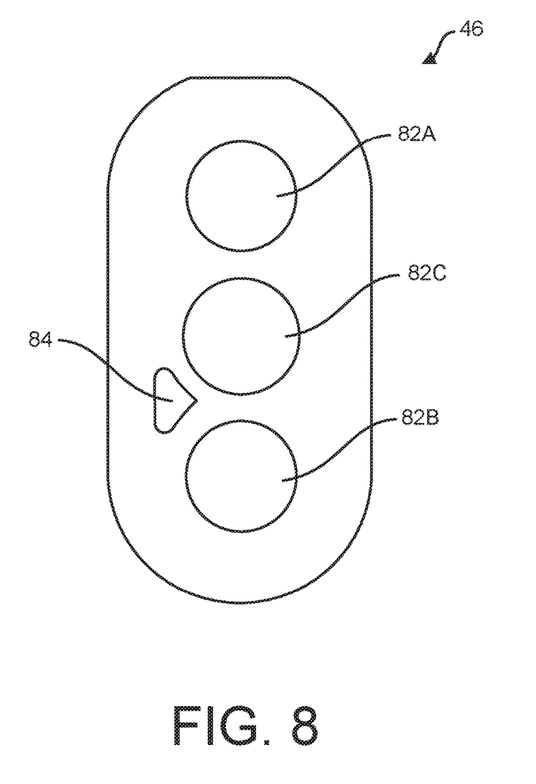
FIG. 8 illustrates an exemplary compressible foam layer of the lens assembly of FIG. 2A.

Referring next to FIG. 8, an exemplary compressible foam layer 46 is illustrated. Compressible foam layer 46 is configured to abut a portion of installed electronic device 10. In some exemplary embodiment, compressible foam layer 46 is formed from a light-blocking material to prevent light from flash 16 from entering cameras 14A, 14B without first passing through lens assembly 34, thereby providing enhanced image quality. Compressible foam layer 46 illustratively includes three optical apertures 82A, 82B, 82C configured to align with the first camera 14A, second camera 14B, and flash 16, respectively, of electronic device 10. The three optical apertures 82A, 82B, 82C form a portion of optically transparent portions 48, 50, 52 of lens assembly 34. Compressible foam layer 46 further includes acoustic aperture 84 configured to align with microphone 18 of electronic device. Acoustic aperture 84 forms a portion of acoustically transparent region 54 of lens assembly 34.

Referring again to FIGS. 2A-2F, optically transparent portion 48 corresponding to first camera 14A illustratively includes aperture 56 of adhesive ring 36, optically transparent regions 66A and 68A of lens 38, optical aperture 72A of first adhesive layer 40, optical aperture 76A of water-resistant membrane 42, optical aperture 78A of second adhesive layer 44, and optical aperture 82A of compressible foam layer 46. Optically transparent portion 50 corresponding to second camera 14B illustratively includes aperture 56 of adhesive ring 36, optically transparent regions 66B and 68B of lens 38, optical aperture 72B of first adhesive layer 40, optical aperture 76B of water-resistant membrane 42, optical aperture 78B of second adhesive layer 44, and optical aperture 82B of compressible foam layer 46. Optically transparent portion 52 corresponding to flash 16 illustratively includes aperture 56 of adhesive ring 36, optically transparent regions 66C and 68C of lens 38, optical aperture 72C of first adhesive layer 40, optical aperture 76C of water-resistant membrane 42, optical aperture 78C of second adhesive layer 44, and optical aperture 82C of compressible foam layer 46. Acoustically transparent portion 54 corresponding to second camera 14B illustratively includes aperture 56 of adhesive ring 36, acoustic aperture 70 of lens 38, acoustic aperture 74 of first adhesive layer 40, a portion of water-resistant membrane 42, acoustic aperture 80 of second adhesive layer 44, and acoustic aperture 84 of compressible foam layer 46.

Referring next to FIG. 9, a sectional view of the lens assembly 34 in a protective case 20 is illustrated. Protective case 20 illustratively includes a raised perimeter 88 surrounding aperture 32. Lens assembly 34 is adhered to the device side of the rear of case 20 by adhesive ring 36. As shown in FIG. 9, a beveled edge 90 extends from the perimeter 88 towards the lens assembly 34.

The elements, components, and steps described herein are meant to exemplify some types of possibilities. In no way should the aforementioned examples limit the scope of the invention, as they are only exemplary embodiments.

The phrases "in some embodiments," "according to some embodiments," "in the embodiments shown," "in other embodiments," "in some examples," "in other examples," "in some cases," "in some situations," "in one configuration," "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

The foregoing disclosure has been presented for purposes of illustration and description. Other modifications and variations of the disclosed techniques may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention, except as limited by the prior art.

What is claimed is:

1. A protective case for an electronic device having a camera and a microphone, the protective case including a lens assembly comprising:
a transparent lens having a first side configured to face the electronic device and at least partially cover the camera when the electronic device is installed in the protective case and a second side opposite the first side; wherein a first portion of the first side and a second portion of the second side are each coated with a light-blocking material and a first optically transparent portion of the first side and a second optically transparent portion of the second side are uncoated; the second optically transparent portion having an area greater than an area of the first optically transparent portion; and
a water-resistant membrane attached to the transparent lens and configured to cover the microphone of the installed electronic device.

2. The protective case of claim 1, wherein the first side of the transparent lens includes a first transparent lens portion and the second side of the transparent lens includes a second transparent lens portion, wherein the first transparent lens portion and the second transparent lens portion are configured to be aligned with the camera of the installed electronic device.

3. The protective case of claim 2, wherein the first side of the transparent lens includes a third transparent lens portion and the second side of the transparent lens includes a fourth transparent lens portion, wherein the third transparent lens portion and the fourth transparent lens portion are configured to be aligned with a flash of the installed electronic device.

4. The protective case of claim 3, wherein the first side of the transparent lens includes a fifth transparent lens portion and the second side of the transparent lens includes a sixth transparent lens portion, wherein the fifth transparent lens portion and the sixth transparent lens portion are configured to be aligned with a second camera of the installed electronic device.

5. The protective case of claim 1, wherein the transparent lens includes a first aperture configured to be aligned with the microphone of the installed electronic device.

6. The protective case of claim 1, wherein the lens assembly further comprises a compressible foam layer, the water-resistant membrane being positioned between the compressible foam layer and the second side of the transparent lens.

7. The protective case of claim 6, wherein the compressible foam layer is formed from a light-blocking material.

8. The protective case of claim 1, further comprising a back portion configured to at least cover a back portion of the installed electronic device, the back portion including an aperture, wherein the lens assembly is positioned in the aperture.

9. The protective case of claim 8, wherein the lens assembly and back portion of the protective case form a waterproof seal preventing water from entering an interior portion of the protective case configured to receive the electronic device.

10. The protective case of claim 8, wherein the aperture has a beveled perimeter.

11. A protective case for an electronic device having a camera, a flash, and a microphone, the protective case including a lens assembly comprising:
a water-resistant membrane configured to cover the microphone of the installed electronic device;
a transparent lens affixed to the water-resistant membrane, the transparent lens including:
a first side configured to face the electronic device and fully cover the camera and the flash when the electronic device is installed in the protective case, a first portion of the first side being coated with a light-blocking material and a second optically transparent portion of the second side that is free from the light-blocking material;
a second side opposite the first side, a second portion of the second side being coated with a light-blocking material and a second optically transparent portion of the second side that is free from the light-blocking material, wherein the second optically transparent portion has an area greater than an area of the first optically transparent portion; and
a first aperture configured to be aligned with the microphone of the installed electronic device.

12. The protective case of claim 11, the first side of the transparent lens includes a first transparent lens portion and the second side of the transparent lens includes a second transparent lens portion, wherein the first transparent lens portion and the second transparent lens portion are configured to be aligned with the camera of the installed electronic device, the first transparent lens portion having an area greater than an area of the second transparent lens portion.

13. The protective case of claim 12, wherein the first side of the transparent lens includes a third transparent lens portion and the second side of the transparent lens includes a fourth transparent lens portion, wherein the third transparent lens portion and the fourth transparent lens portion are configured to be aligned with the flash of the installed electronic device, the third transparent lens portion having an area greater than an area of the fourth transparent lens portion.

14. The protective case of claim 13, wherein the first side of the transparent lens includes a fifth transparent lens portion and the second side of the transparent lens includes a sixth transparent lens portion, wherein the fifth transparent lens portion and the sixth transparent lens portion are configured to be aligned with a second camera of the installed electronic device, the first transparent lens portion having an area greater than an area of the sixth transparent lens portion.

15. The protective case of claim 14, wherein the first, third and fifth transparent portions are each circular in shape.

16. The protective case of claim 12, wherein the water-resistant membrane includes a first aperture aligned with the second transparent portion.

17. A protective case for an electronic device, the protective case comprising:
a front surface configured to at least partially cover a front surface of the electronic device when the electronic device is installed in the protective case, the front surface of the protective case configured to allow interactive access to a touch screen of the electronic device;
a plurality of side surfaces configured to at least partially cover a plurality of side surfaces of the installed electronic device; and
a rear surface configured to at least partially cover a rear surface of the installed electronic device, the rear surface including a lens assembly for protecting a camera, a flash, and a microphone of the installed electronic device, the lens assembly comprising:
a water-resistant membrane attached to the transparent lens and configured to cover the microphone of the installed electronic device, the water-resistant membrane including a first aperture configured to be aligned with the camera of the installed electronic device and a second aperture configured to be aligned with the flash of the installed electronic device; and
a transparent lens affixed to the water-resistant membrane, the transparent lens including:
a first side configured to face the electronic device and fully cover the camera and the flash when the electronic device is installed in the protective case, a first portion of the first side being coated with a light-blocking material;
a second side opposite the first side, a second portion of the second side being coated with a light-blocking material, wherein the first portion has an area greater than an area of the second portion; and
a third aperture configured to be aligned with the microphone of the installed electronic device.

18. The protective case of claim 17, wherein the water-resistant membrane further includes a fourth aperture configured to be aligned with a second camera of the installed electronic device.

19. The protective case of claim 16, wherein the rear surface of the protective case includes a beveled perimeter surrounding the lens assembly.

20. The protective case of claim 16, wherein the transparent lens is affixed to the water-resistant membrane by an adhesive layer, the adhesive layer including an aperture configured to be aligned with the third aperture of the transparent lens.

* * * * *